Oct. 30, 1934.    T. H. OPPENHEIM    1,978,717
RAKE MECHANISM
Filed March 17, 1933
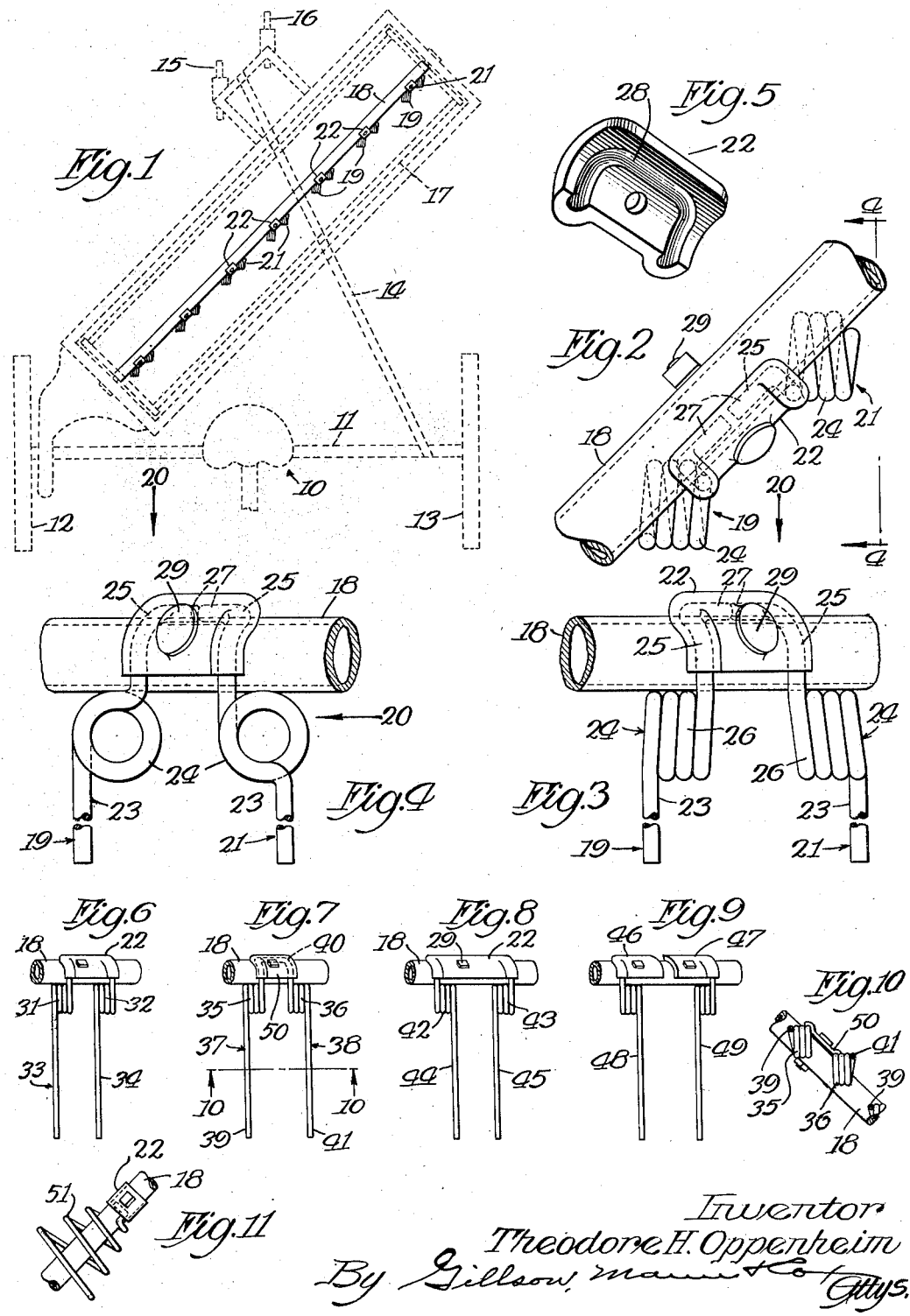
Inventor
Theodore H. Oppenheim
By Gillson, Mann & Co.
Attys.

Patented Oct. 30, 1934

1,978,717

UNITED STATES PATENT OFFICE 1,978,717

RAKE MECHANISM

Theodore H. Oppenheim, Coldwater, Ohio, assignor to The New Idea Spreader Company, a corporation of Ohio Application March 17, 1933, Serial No. 661,276

14 Claims. (Cl. 56—400)

This invention relates to raking devices for gathering or collecting hay and the like.

One of the objects of the invention is the provision of a new and improved rake having novel means for attaching the teeth thereto.

Another object of the invention is the provision of a new and improved rake tooth having a novel arrangement of the resilient coil portion thereof, whereby when in use the pressure on the tooth will be in a plane normal to the axis of the coil.

A further object of the invention is the provision of a new and improved rake tooth having its resilient coil portion so arranged that when in use the coils will not bind each other, but will be free to move relatively to each other with a minimum of friction, together with novel means of securing the teeth in position, whereby an individual tooth may be easily removed for replacement or repair.

Another object of the invention is the provision of a new and improved rake tooth that is simple in construction, efficient in operation, that may readily be attached or detached from the rake mechanism, and that is not likely to become distorted or broken.

Other and further objects and advantages of the invention will appear from the following description taken in connection with the accompanying drawing, in which Fig. 1 is a plan view of a rake bar showing the invention in position thereon, and showing an agricultural implement in dotted lines;

Fig. 2 is a plan view of a portion of a rake bar on an enlarged scale from that shown in Fig. 1;

Fig. 3 is an elevation of a portion of a rake bar showing the invention in position thereon;

Fig. 4 is a section on line 4—4 of Fig. 2;

Fig. 5 is a perspective view of the clip for holding the teeth in position on the bar;

Fig. 6 is an elevation of the rake bar showing two teeth connected by a single clip, the coils of the two teeth being wound in the same direction;

Fig. 7 is a similar view but showing the coils wound in opposite directions with the attaching portions of the coil on the inside;

Fig. 8 is a similar view to that shown in Fig. 7 but showing the attached portions of the coil on the outside;

Fig. 9 is a view similar to Fig. 8 but showing individual clips for holding the rake teeth;

Fig. 10 is a section on line 10—10 of Fig. 7; and

Fig. 11 is a plan view of a portion of rake bar showing a further modified form of coil for the rake tooth.

It is common practice in the manufacture of side delivery rakes to attach the teeth to the rake bars of the drum in such a manner that the axis of the coils is parallel to the bars and diagonal to the line of travel of the machine. Such an arrangement is objectionable because the force applied to the teeth in passing over obstructions and in actual normal operation is in the line of travel and consequently in a direction to cause the turns of the coils in those teeth in which the coils are on the forward side to frictionally engage each other, thereby preventing free resilient movement of the turns of the coil that is so desirable in such constructions. As a result of this arrangement, the turns of these coils bind to such an extent that the resiliency of the tooth, due to the coil, is greatly impaired, if not altogether destroyed. In those teeth in which the coils are on the rear side of the teeth, such a force tends to spread the coil instead of winding it, as is necessary to obtain the proper action on the coil.

It is common practice to make the teeth in pairs integrally connected and in some cases to have the tooth coil encircle the bar, and, as a result, when one tooth becomes broken, it is not only necessary to remove a number of other teeth in order to remove the broken tooth from the bar, but it is also necessary to insert a pair of new teeth for the pair in which only one is broken or damaged.

The present invention seeks to remedy these defects by so arranging the coils that their axes will be normal to the line of travel, whereby when the teeth strike an obstruction and are forced rearwardly, the turns of the coil are free to move relatively to each other and in a direction tending to wind the coil. By means of this arrangement, the resiliency of the coil will prevent the breaking of the tooth at the coil. Means are also provided for employing separate teeth and so connecting them to the bar that each may be removed and replaced without disturbing or removing the remaining teeth.

For convenience of description and simplicity in illustration, the invention is shown as being applied to the rake bars of a side delivery rake.

Referring now to the drawing, the reference character 10 designates a side delivery rake having the axle 11, the wheels 12 and 13, frame member 14 supported at its rear end by the caster wheels 15 and 16, as is usual in such constructions. The direction of travel of the rake is in the direction indicated by the arrows 20 in Figs. 1, 2 and 4.

The rake drum is shown at 17 and carries the rake bars 18. The axis of the drum is arranged at an angle to the wheel axle 11 usually at about 45° and the mechanism is of the usual or any well known construction. Since the details of the rake mechanism constitute no part of the present invention, it is not thought necessary to further illustrate or describe the same.

Referring to Figs. 1 to 5, the rake teeth are arranged in pairs, each pair comprising the teeth 19 and 21 which are secured to the rake bar 18 by a single clip 22. Each rake tooth is formed from a single rod and comprises the body portion 23, a coil portion 24 and an attaching portion 25.

The coil portion 24 comprises a plurality of turns 26 and is so arranged that when the tooth is attached to the bar 18 the axis of the coil will be at an angle to the bar 18 and be normal to the force applied to it. In the description and claims the rake bar 18 is assumed to be in its lowermost or operative position. When the tooth, while in operation, encounters an obstruction and is forced rearwardly, the turns of the coil 26 will be free to move relative to each other, whereby the resiliency of the coil will permit the rearward movement of the tooth to pass the obstruction.

Theoretically, there are two forces acting on the tooth when it strikes an obstruction, one the forward movement of the vehicle, and the other the rotary movement of the rake drum, consequently in theory the resultant of these forces would not be in the line of draft, and the axes of the coils would not be normal to this line. It has been found by experiment that where the axis of the reel is arranged at an angle of 45° to the rake axle, satisfactory results are obtained by arranging the axes of the coils at an angle of 22½° to the axis of the reel. It is understood, however, that these angles may be varied since the invention comprises any arrangement of the parts in which the coil will tend to be wound without friction among the turns or without spreading the turns apart, when the tooth encounters an obstruction during the operation of the rake.

It is desirable that means be provided whereby an individual tooth may be replaced when broken or distorted with a minimum amount of time and labor. In the form of construction selected to illustrate one embodiment of the invention, which is by way of example only, the teeth are arranged in pairs, two separate and independent teeth in each pair, with the coils of the teeth arranged at one side of the rake bar 18 and secured in position by the clip 22.

The upper end of the attaching portion 25 of each tooth is bent to conform to the surface of the bar, which, in the form shown, is cylindrical. The end of the attaching portion is distorted as by being bent laterally, as at 27, for assisting in locking the tooth in position in the clip 22, which is provided with a U-shaped recess 28 for receiving the attaching portions of a pair of teeth. Suitable means are provided for clamping the attaching portions of the teeth between the clip 22 and the bar 18, such for instance as the bolt 29.

In the operation of the device, assuming that the rake is travelling in the direction indicated by the arrows 20, the rake teeth coming in contact with an obstruction during the rotation of the reel 17 will cause the teeth to move rearwardly, thereby winding up the coils 24 which will yield to permit the teeth to pass the obstruction. When it is desired to remove one of the teeth, the clip 22 is released sufficiently to permit the removal of the tooth. The companion tooth need not necessarily be removed.

In Fig. 6 is shown a modified form of tooth construction. In this form of the device, the coils 31 and 32 of the rake teeth 33 and 34, respectively are wound in the same direction. They are shown as being wound right-handed. They are attached to the bar 18 in the manner just described. In the form of the construction shown in Figs. 7 and 10, the coils 35 and 36 of the rake teeth 37 and 38 are wound in opposite directions with the coils on the inside. In Fig. 7 the two teeth and coils are made from a single length of wire, as indicated in dotted lines at 40, and are secured in position by a single clip 50. As shown in Fig. 10, the tines 39 and 41 are staggered relative to the bar 18. That is, the tine 39 is rearwardly of the tine 41 relative to the axis of the bar 18. In this form of construction, one tine of each pair of teeth will be offset rearwardly throughout the length of the bar 18. In the operation of hay rakes and the like where the tines are all in alignment parallel to the axis of the rake bar 18, there is a tendency of the hay to be rotated, thus forming it into a rope or roll. By offsetting each alternate tine, this tendency to rotate is greatly reduced, if not altogether eliminated.

In Fig. 8 the construction is the reverse of that shown in Fig. 3, that is, coils 42 and 43 of the teeth 44 and 45 are arranged on the outside instead of the inside of the tines.

In Fig. 9, the construction differs from that shown in Fig. 8 in that separate clips 46 and 47 are provided for the teeth 48 and 49. By means of this arrangement, a tooth and its hold clip may be entirely removed without interfering in any way with the other teeth and their holding clips.

In the form of construction shown in Fig. 11, the coil 51 of the tooth encircles the bar 22. This coil may be cylindrical or it may be conical, as shown in said figure. Where it is conical, the tine has a greater freedom of movement than where it is cylindrical. In all forms of the construction, the coils and tines are so arranged and so attached to the bar that in the operation of the implement, pressure on the tines will leave the coil resilient and free acting—that is, there will be no binding of the coil during the operation of the device. While the coils are shown wound in such a manner that any resistance to their movement during the hay raking operation tends to tighten the coils, it is understood that the coils may be reversed whereby resistance will tend to unwind the coils. In any event, their axes are so arranged that the coils will not bind on each other when the teeth meet with resistance during the operation of the device.

It is thought from the foregoing taken in connection with the accompanying drawing that the construction and operation of my device will be apparent to those skilled in the art, and that changes in size, shape, proportion and details of construction may be made without departing from the spirit and scope of the appended claims.

I claim as my invention:

1. In a rake mechanism having a frame and a diagonally secured rake bar movably mounted on said frame, the combination of rake teeth carried by said bar, each tooth having its upper portion formed into a coil with its axis at an angle to said bar and normal to the line of force tending to bend said tooth during the normal operation of the rake mechanism.

2. In a rake mechanism having a frame and a rake bar carried by said frame and arranged at an angle to the longitudinal centerline of the same, the combination of teeth carried by said bar, each tooth having a coil portion positioned outwardly of said bar, the axis of said coil being at an acute angle to said bar.

3. A tooth for a rake mechanism comprising a rod member having a coil adjacent one end, and means for detachably attaching said tooth to a rake tooth support with the axis of said coil at an acute angle to the axis of said support.

4. In a rake mechanism having a rake bar, the combination of a plurality of individual teeth for said bar, said teeth being secured in pairs, and clips for securing said teeth to said bar, each clip constituting the sole means for securing two of said teeth to said bar.

5. In a rake mechanism having a bar, the combination of a plurality of individual rake teeth for said bar, each of said teeth having a body portion, a resilient coil portion and an attaching portion, said teeth being secured in pairs, a clip for each pair for securing the same to said bar, said teeth having the axes of their coils parallel.

6. In a side delivery rake having a raking drum and a rake bar carried by said drum, the combination of a plurality of rake teeth, each tooth comprising a body portion, a coiled portion and an attaching portion, and means for securing each of said teeth to said bar with the planes of the turns of said coil extending in the direction of the resultant of the forces operating on said tooth during the normal operation of said rake.

7. In a rake mechanism having a rake tooth support, the combination of a plurality of rake teeth each formed from a single length of wire and having a body portion, a coiled portion, and an attaching portion, and means for securing said teeth to said support with the axes of said coils in parallel planes.

8. In a rake, a rake bar, the combination of teeth secured to said bar, each tooth having a tine portion, an attaching portion and a coil portion, the axes of said coil portions being in parallel lines and extending at an angle to the direction in which said rake is travelling along the ground and also at an acute angle to said bar.

9. In a rake mechanism having a rake bar, the combination of a plurality of rake teeth attached to said bar, each tooth having a tine portion, an attaching portion and a coil portion, the axes of said coil portions being arranged at an angle to said bar, said teeth being secured in staggered relation.

10. In a rake mechanism having a rake bar, the combination of a plurality of teeth secured to said bar, each tooth having an attaching portion, a body portion and a coil portion, the axes of said coil portions being parallel and at such an angle to said bar that the line of resistance to the movements of the teeth during the normal operation of the rake will be normal to the axes of the coil portions, thereby tending to wind up such coils.

11. In a rake mechanism provided with an axle, wheels on the axle and a frame secured to said axle, the combination of a rotating drum on said frame arranged at an angle to said axle, a plurality of tooth bars carried by and rotating with said drum and a plurality of rake teeth secured to each of said bars, each of said teeth comprising an attaching portion, a tine portion and a coil portion, the axes of said coil portions being parallel and arranged at such an angle to said bar that the line of resistance to the movement of the tooth during the normal operation of the rake will be normal to the axis of said coil portion.

12. In a rake mechanism having a rake bar, the combination of a plurality of rake teeth, said teeth being secured in pairs integral with each other, each tooth comprising a tine portion and a coil portion and each pair of teeth having an attaching portion in common, a single clip for the attaching portion of each pair of teeth for rigidly connecting the teeth to its respective bar with the axes of said coils parallel and secured at an angle to said bar.

13. In a rake mechanism having a frame and a rake drum rotatably carried by said frame, the combination of tooth bars on said drum, rake teeth, means for securing said teeth to said bars, said teeth having tine portions and coil portions, the axes of said coil portions being parallel and secured at an angle to said bars, certain of said teeth being secured in advance of the remaining teeth whereby a line joining the points of the lower ends of said teeth will be zig-zag, thereby preventing roping of the hay during the raking operation.

14. In a rake mechanism having a rake tooth supporting member, the combination of a plurality of rake teeth secured to said member, certain of said teeth operating in advance of certain of the adjacent teeth whereby roping of the hay is prevented during the raking operation.

THEODORE H. OPPENHEIM.